(12) United States Patent
Martin (10) Patent No.: US 8,738,159 B2
(45) Date of Patent: May 27, 2014

(54) SYSTEM AND METHOD FOR ACCESSING PLC DATA ON DEMAND

(75) Inventor: David Martin, Jonesborough, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 476 days.

(21) Appl. No.: 11/058,532

(22) Filed: Feb. 15, 2005

(65) Prior Publication Data
US 2005/0203648 A1 Sep. 15, 2005

Related U.S. Application Data

(60) Provisional application No. 60/553,311, filed on Mar. 15, 2004.

(51) Int. Cl.

| | |
|---|---|
| G05B 11/01 | (2006.01) |
| G05B 15/00 | (2006.01) |
| G05B 15/02 | (2006.01) |
| G05B 19/05 | (2006.01) |
| G05B 19/408 | (2006.01) |
| G05B 19/409 | (2006.01) |
| G05B 19/42 | (2006.01) |
| G06F 9/54 | (2006.01) |
| G06F 11/20 | (2006.01) |
| G06F 13/00 | (2006.01) |
| G06F 15/16 | (2006.01) |
| G06F 15/173 | (2006.01) |
| G06F 17/30 | (2006.01) |
| G06F 21/31 | (2013.01) |
| G06F 21/78 | (2013.01) |
| H04L 9/32 | (2006.01) |
| H04L 29/06 | (2006.01) |
| H04W 12/06 | (2009.01) |

(52) U.S. Cl.
CPC .............. *H04L 63/083* (2013.01); *G05B 15/02* (2013.01); *G05B 19/05* (2013.01); *G05B 19/056* (2013.01); *G05B 19/408* (2013.01); *G05B 19/409* (2013.01); *G05B 2219/1205* (2013.01); *G06F 9/547* (2013.01); *G06F 11/2074* (2013.01); *G06F 17/30595* (2013.01); *G06F 21/31* (2013.01); *G06F 21/78* (2013.01); *H04L 9/3226* (2013.01); *H04L 29/06* (2013.01); *H04W 12/06* (2013.01); *Y10S 707/99931* (2013.01); *Y10S 707/99937* (2013.01)
USPC ........ 700/87; 700/9; 700/17; 700/83; 700/86; 709/208; 709/211; 709/225; 709/238; 719/330; 719/331; 707/999.001; 707/999.007

(58) Field of Classification Search
CPC ...... G05B 15/02; G05B 19/05; G05B 19/056; G05B 19/408; G05B 19/409; G05B 2219/1205; G06F 9/547; G06F 11/2074; G06F 17/30595; G06F 21/31; G06F 21/78; H04L 9/3226; H04L 29/06; H04L 63/083; H04W 12/06; Y10S 707/99931; Y10S 707/99937
USPC .............. 700/9, 17, 83, 86, 87; 709/208, 211, 709/225, 238; 719/330, 331
See application file for complete search history.

(56) References Cited

U.S. PATENT DOCUMENTS

| | | | | |
|---|---|---|---|---|
| 4,348,720 A | * | 9/1982 | Blahut et al. | 710/26 |
| 5,283,883 A | * | 2/1994 | Mishler | 710/33 |

(Continued)

*Primary Examiner* — Mohammad Ali
*Assistant Examiner* — Jennifer L Norton (57) ABSTRACT

A system for providing programmable logic data on demand includes a portion for receiving a plurality of data requests at the programmable logic controller and a portion for processing the plurality of data requests asynchronously. An interface enables asynchronous processing to enhance and extend capabilities of the programmable logic controller.

18 Claims, 5 Drawing Sheets

(56) References Cited

U.S. PATENT DOCUMENTS

| | | | |
|---|---|---|---|
| 5,805,442 A * | 9/1998 | Crater et al. | 700/9 |
| 6,334,158 B1 * | 12/2001 | Jennyc et al. | 719/328 |
| 6,675,226 B1 * | 1/2004 | Nair et al. | 709/250 |
| 6,904,471 B2 * | 6/2005 | Boggs et al. | 710/8 |
| 7,035,697 B1 * | 4/2006 | Brown | 700/56 |
| 7,058,973 B1 * | 6/2006 | Sultan | 726/12 |
| 7,110,837 B2 * | 9/2006 | Oka et al. | 700/87 |
| 7,516,265 B2 * | 4/2009 | Martin et al. | 711/100 |
| 2003/0023333 A1 * | 1/2003 | Birkle | 700/96 |
| 2003/0023336 A1 * | 1/2003 | Kreidler et al. | 700/108 |
| 2004/0098141 A1 * | 5/2004 | Martin | 700/18 |
| 2005/0021839 A1 * | 1/2005 | Russell et al. | 709/238 |

* cited by examiner

SYSTEM AND METHOD FOR ACCESSING PLC DATA ON DEMAND

CROSS-REFERENCE TO RELATED APPLICATIONS

This application claims benefit of U.S. Provisional Patent Application Ser. No. 60/553,311, filed Mar. 15, 2004.

FIELD OF THE INVENTION

The present invention relates to a programmable logic controller (PLC). More specifically, the present invention relates to accessing PLC data on demand.

BACKGROUND OF THE INVENTION

Programmable logic controllers (PLC's) are commonly used in process control technology. As a part of process control, a PLC is used to monitor input signals from a variety of input points (input sensors), which report events and conditions occurring in a controlled process. A control program stored in memory of an operating system within the PLC enhances the PLC operating system by creating an environment in which other programs are run. Usually one of these programs in concert with the control program instructs the PLC what actions to take upon encountering particular input signals or conditions. For example, the PLC can monitor input conditions such as motor speed, temperature, pressure, volumetric flow and the like. The PLC can issue output signals to speed up or slow down a conveyer, rotate the arm of a robot, open or close a relay, raise or lower temperature as well as numerous other control functions. Input and outpoint points and related devices, signals, conditions and processes are generally referred to as "I/O" in the industry.

"Soft PLC" programs allow a high-end computer, often with multiple processors, to simulate the operation of a special purpose central control computer. Such a soft PLC program functions as a central processing unit (CPU) to execute programs written in, for example, relay-ladder language to control plug-in I/O modules communicating control signals between the computer and the controlled process.

Figure 1:
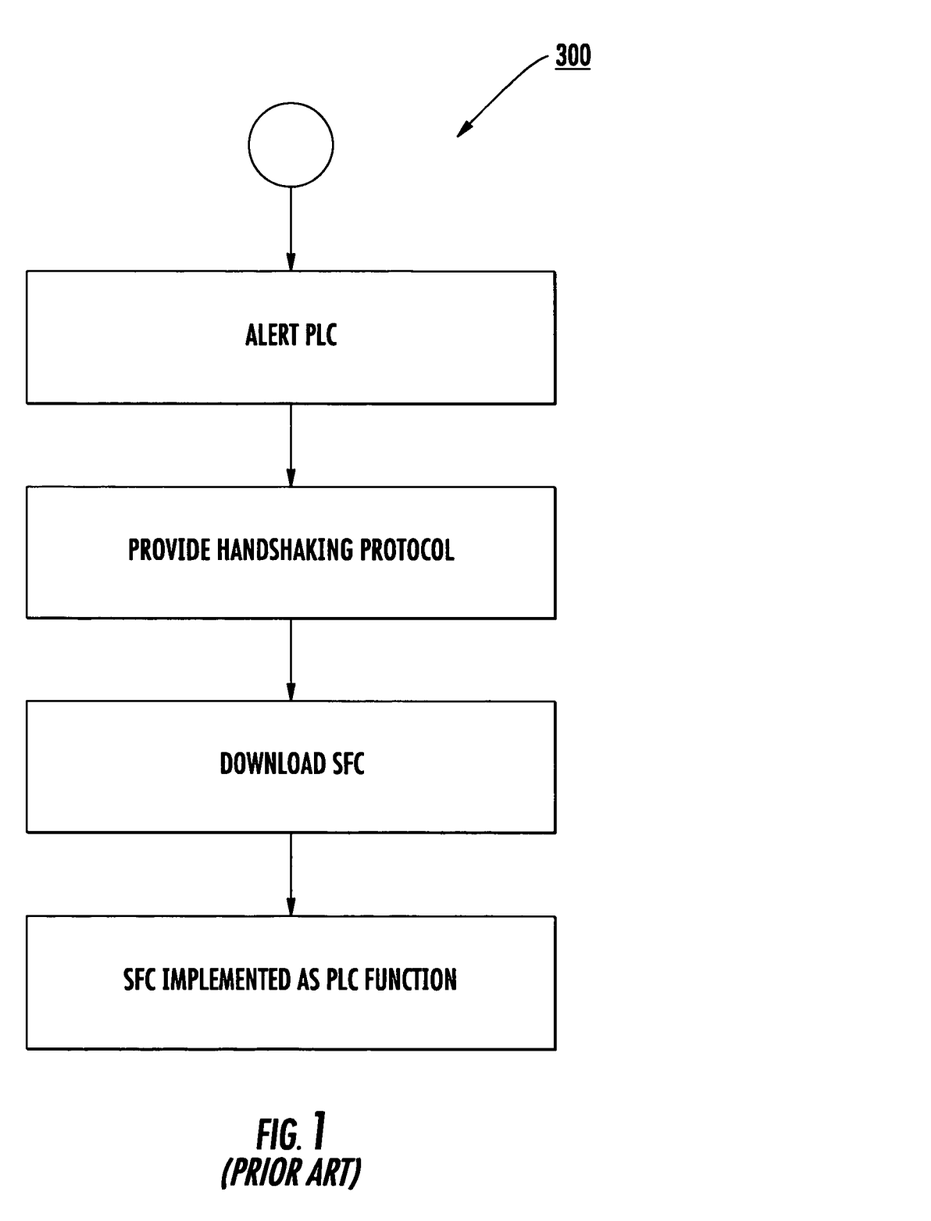
FIG. 1 is a flowchart of a conventional implementation of an SFC in a PLC.

The conventional Soft PLC supports System Function Calls (SFC's), which allow the user to upload customized functions to the PLC. SFC's are created by Siemens® development groups and are uploaded, downloaded, deleted and copied to memory of the PLC. FIG. 1 shows a system 300 in which an SFC is being downloaded, for instance, to the PLC. SFC's do not necessarily require any user data, although allocation of system data may be provided. SFC's downloaded to the PLC become part of the operating system of that PLC. The PLC reports the existence of SFC's in the appropriate directory communication functions.

Despite the flexibility provided by SFC's, there is a strong desire in today's market for more flexible access to the memory of the PLC for third party devices and software. This accessibility needs to be able to be triggered based on input from the external entity to the PLC and needs to be asynchronous in nature. Therefore, there is a need not yet met by conventional systems or methods to provide PLC data on demand.

BRIEF SUMMARY OF THE INVENTION

The present invention provides features that enhance and extend the capability of a PLC by providing on demand PLC data. In general, an interface provides direct access to the PLC memory areas with multiple direct memory access streams active at the same time. The interface provides an ability to read a single or multiple memory location(s) in the PLC with a single read call on demand from external entities. Further, the interface permits writing to a single or multiple memory location(s) in the PLC with a single write call on demand from external entities. The interface also allows creation of cyclic reads of single or multiple memory locations in the PLC with a single call on demand from external entities. These cyclic reads of single or multiple memory locations in the PLC with a single call on demand from external entities can be started, stopped and/or deleted according to the interface. Multiple requests can also be issued without having to wait for the completion of the first request.

In one aspect of the invention, a method for providing programmable logic controller data on demand includes the steps of loading an access code from an external application for pass through access to a memory area of a programmable logic controller; receiving a function call at the programmable logic controller from the external application; and accessing a plurality of memory locations on demand in the area of the programmable logic controller in response to the function call. The function call can be a read call, a write call, a cyclic data request and combinations of these calls, request, and the like.

Also in this aspect of the invention, the method can include additional steps of receiving a call to create the cyclic data request; processing the cyclic data request; receiving a call to terminate processing of the cyclic data request; terminating the processing; receiving a call to delete a cyclic read of the plurality of memory locations; and returning data stored at the memory area to the external application in response to the function call.

In another aspect of the present invention, a method for providing programmable logic controller data on demand includes the steps of receiving a plurality of data requests at a programmable logic controller and processing the plurality of data requests asynchronously. This method may include the step of providing means for direct access to at least one memory location of the programmable logic controller. Such means for direct access can be command code in a direct access function framed in a dynamic linked library or the like.

In yet another aspect of the present invention, a system for providing programmable logic data on demand is provided with a programmable logic controller having at least one memory area; means for receiving a call on demand from at least one external entity; and means for directly accessing the memory area. The means for receiving, for example, can be a portion of an interface defined in a dynamic linked library. By way of further example, the call can be a read call, a write call, a plurality of cyclic reads or combinations of these calls and reads or the like.

Further, in this aspect of the invention, the external entity is configured to create, start, stop, or delete the cyclic reads. Also, the means for directly accessing the memory area is defined in a segment of the external entity downloadable by the means for receiving.

In still another aspect of the present invention, a system for providing programmable logic data on demand includes a first portion for receiving a plurality of data requests at a programmable logic controller; and a second portion for processing the plurality of data requests asynchronously, wherein an interface enables the asynchronous processing. In this aspect, the first portion is a dynamic linked library associated with the programmable logic controller. Additionally, the second portion can be a dynamic linked library associated with an application, a memory area defined in the programmable logic controller, and combinations of these aspects of the invention.

By way of further example, the interface in this aspect establishes a pass through portal from the external application to a memory area of the programmable logic controller. The pass through portal is configured for loading into a dynamic linked library associated with the programmable logic controller.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

DETAILED DESCRIPTION

Detailed reference will now be made to the drawings in which examples embodying the present invention are shown. Repeat use of reference characters in the drawings and detailed description is intended to represent like or analogous features or elements of the present invention.

The drawings and detailed description provide a full and detailed written description of the invention and the manner and process of making and using it, so as to enable one skilled in the pertinent art to make and use it. The drawings and detailed description also provide the best mode of carrying out the invention. However, the examples set forth herein are provided by way of explanation of the invention and are not meant as limitations of the invention. The present invention thus includes modifications and variations of the following examples as come within the scope of the appended claims and their equivalents.

Definitions

As used herein, the term "interface" is used to mean a working connection between at least two entities that may be physical or more often, metaphysical, and more particularly, the interface provides a protocol or mechanism by which the abstract concept of a working connection is made. By way of example, a Dynamic Linked Library (DLL) can be used to establish the interface. DLL is a type of file used with Microsoft® Windows®, Windows® software programs, and Windows® drivers. DLL files allow executable code modules to be loaded on demand, linked at run time, and unloaded when not needed. Specifically, DLL files contain one or more executable subroutines that can be called by one or more programs to perform routine tasks. Thus, DLL files enable software developers to use Microsoft® Corporation's or other companies' routines to perform common tasks and avoid unnecessary duplication of commonly used code. The interface used herein is not, however, limited to DLL files. For instance, analogous interfaces are available using UNIX®, MacOS®, Linux® or other operating systems.

As used herein, the term "ODK" is used to mean an Open Development Kit, which enables a user to create custom software that interacts directly and asynchronously with a programmable logic controller such as a Windows® Logic Controller (WinLC™). By way of example, a Windows®-based SIMATIC® WinAC® control system, which combines automation tasks such as control, data processing, communication, visualization, and technology on a computer, provides a series of open interfaces to integrate real-time process data with subsequently loaded software applications. A WinAC® ODK enables user-developed extensions, special purpose libraries and add-ins to integrate motion, vision and user-defined C/C++ code with the logic control scan of the WinAC® control system. While the ODK can load DLLs using a "C" interface, the ODK can also use Component Object Model (COM) technology available from Microsoft® Corporation.

As used herein, the term "asynchronous" is used to mean that which is outside of a conventional scan of a PLC and more particularly, to mean real time monitoring and direct access to the PLC by an application at anytime.

As used herein, the term "application" is used to mean software or a device that is external to the PLC, unless otherwise indicated.

As used herein, the term "a" can mean one or more than one, and the term "plurality" can mean one or more than one, unless other indicated.

Description of the Drawings

The present invention is directed in general to providing asynchronous access to PLC data on demand. More specifically, the invention involves the definition of a new interface using an Open Development Kit (ODK) type product that allows for the expansion of a PLC's capabilities to incorporate custom code as part of the PLC itself.

Figure 2:
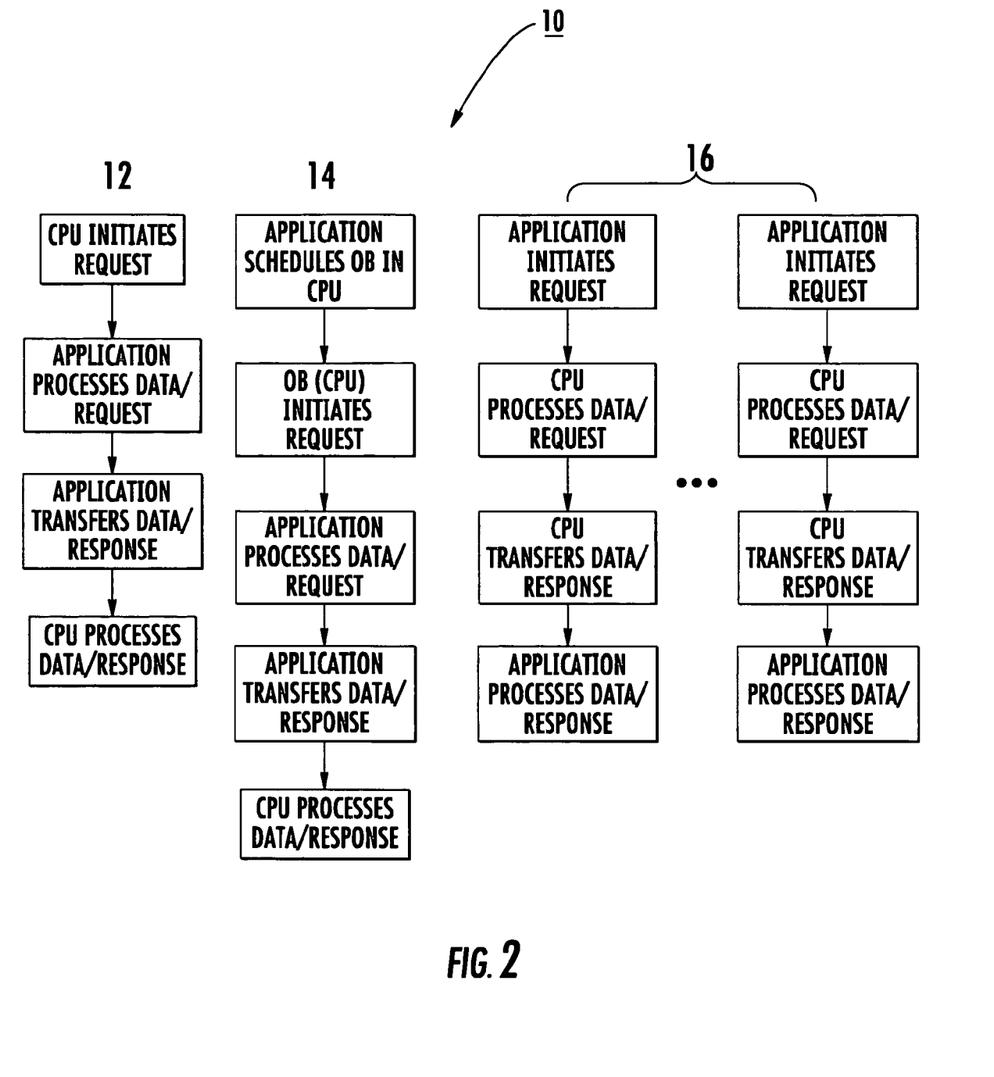
FIG. 2 is a simplified block diagram of a PLC asynchronously interfacing with an application according to an aspect of the present invention.

FIG. 2 broadly depicts an asynchronous interface system and method according to one aspect of the present invention. An interface to the PLC supports several functions that send/retrieve data to/from the PLC. The functions supported by the interface allow for reading and writing data on demand from external entities asynchronously. Additional functions that are supported by the interface provide for the creation, starting, stopping, and deletion of cyclic reads of data from the PLC. These are also asynchronous in nature. The cyclic nature of these functions allow for the repeated retrieval of data from the PLC without having to resend a read request for updated data, if the requested data is from the same memory location.

With more particular reference to FIG. 2, an interface system 10 is broadly depicted in a simplified flowchart. The left most column labeled 12 in the flowchart indicates that the PLC including a central processing unit (CPU) can initiate a request to ultimately transfer data to the external entity or application in accordance with a scan cycle of the PLC. The application is also capable of accessing an area of the PLC such as by scheduling Organizational Blocks (OB) with the host control program as shown in column 14.

The two right most columns labeled 16 in FIG. 2 indicate that the external application, populated with a DLL for example, can be loaded by the PLC to expand capabilities of the PLC. The exemplary DLL must have an interface, e.g., a custom code, expected by the PLC. The PLC loads the code, i.e., the application DLL into the PLC so that communication can occur between the PLC and the external application. The DLL in the PLC will then contain, for instance, an executable subroutine that can be called by the application on demand.

The two right most columns 16 in FIG. 2 further represent that more than one external application can access the PLC simultaneously, sequentially, and/or independently of one other application. Moreover, as described in detail below, these multiple applications can access the PLC numerous times and/or cyclically.

Figure 3:
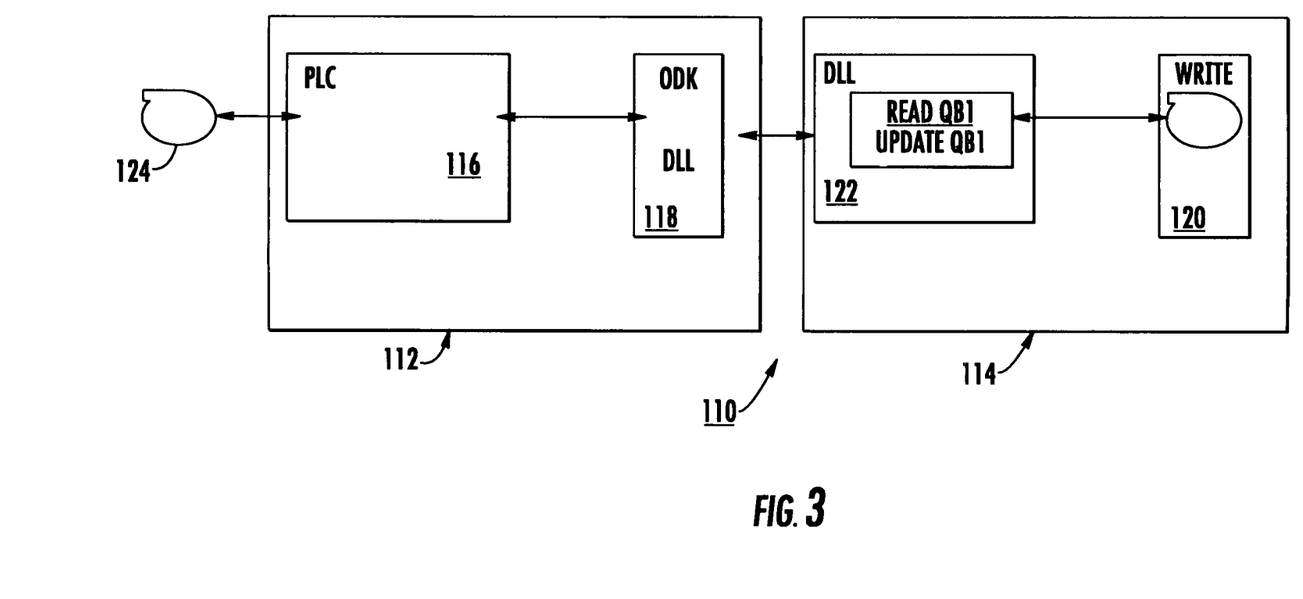
FIG. 3 is a schematic diagram of an asynchronous interface system and method according to another aspect of the present invention.

FIG. 3 shows an embodiment of the invention in which reference number 110 generally indicates an interfaced system. The system 110 broadly includes a PLC product 112 in communication with an external application product 114. More specifically, the PLC product 112 includes a Soft PLC 116 to control one or more functions and measurements as described herein. As shown, a communication link is established between the PLC 116 and an ODK 118 via DLLs. The skilled artisan will appreciate that the PLC 116 is not limited to this software example and can be a "brick" or "chip"-type PLC or other microprocessor-based controller.

The PLC 116 in FIG. 3 can include a CPU in electrical communication with a memory, wherein the memory can contain a control program that, when executed by the CPU, can provide control for at least a portion of the system 110. Accordingly, the PLC 116 can receive inputs from the various components of the system 110 and generate control signals that can be transmitted to the respective components of the system 110 for controlling the operation thereof. It will be appreciated that the control program can conform to any one of a number of different programming languages. For example, the program code can be written in PLC code (e.g., ladder logic), object oriented program code such as C++ or Java, or a number of other languages. Thus, depending on the desired form of operating system, the system 110 can be interfaced using custom code other than DLLs.

With continued reference to FIG. 3, the application product 114 includes an application 120 and/or a customer written DLL 122. The customer may wish to control power to or monitor a mechanical device such as a pump 124, which is in communication with the PLC 116 via I/O as described above. Therefore, the customer will want to access the PLC 116 to regulate the pump 124 or obtain a status of the pump 124. The invention, of course, is not limited to the exemplary pump 124, but can be a tank, a conveyer, an arm of a robot, a relay, or any other device or application susceptible to control functions issued by output signals from the PLC 116.

Those skilled in the art will appreciate that the customer defines an interface between the application 120 and the DLL 122 written in "C", for example. In order for the DLL 122 to obtain status of the pump 124 on demand, the DLL 122 must be able to "open up" the ODK/DLL 118 so that the application 120 can access memory in the PLC 116 at any time without having to request data from the PLC 116 via an OB. Therefore, as briefly introduced above, the DLL 122 must provide the interface expected by the DLL 118, which will load the interface to open up the PLC 116. The customer can then request status of the pump 124 via an interface function call, represented in FIG. 3 as "Read QB1." As described in greater detail below, the PLC 116 next obtains the status and returns it to a buffer provided by the application. The application then updates the status of pump 124, represented in FIG. 3 by "Update QB1" and a pump symbol in the application 120.

The skilled artisan will further appreciate that direct access commands to create the interface according to an aspect of the invention can be written for loading by the PLC 116 as introduced above. In other words, functions which the ODK 118 implements are declared. Once the interface is compiled and loaded, the application 120 can read, write or cyclically read or write to the PLC 116 memory in order to update status asynchronously on demand; e.g., the application 120 can set up a status request every 50 milliseconds by passing through the DLL 118 of the PLC product 112 without having to wait for the PLC 116 to poll. The skilled practitioner will instantly appreciate the pass through operation of the interface in DLL 118 to be implemented, for instance, in ladder logic format.

Figure 4:
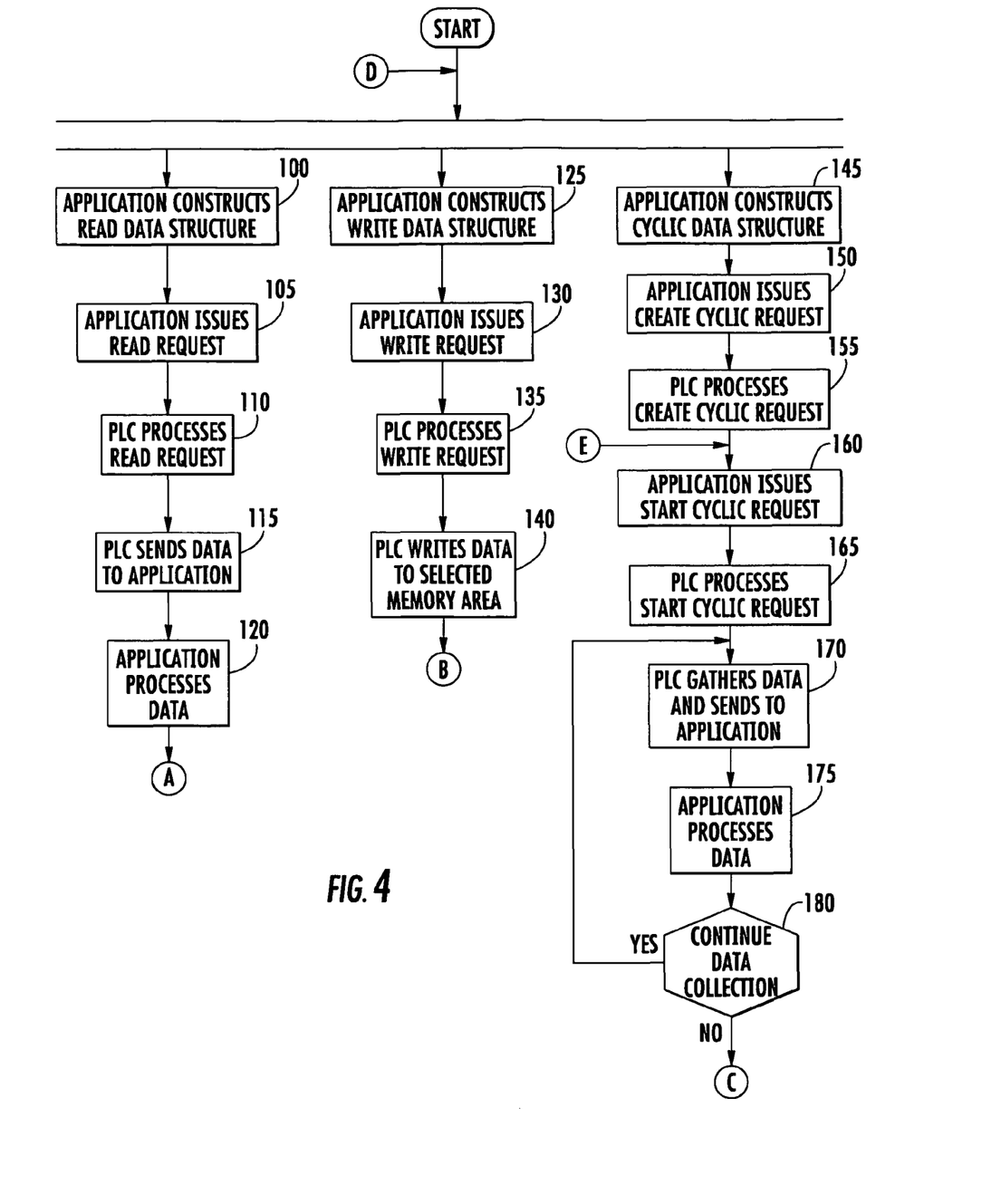
FIG. 4 is a detailed flowchart of the asynchronous interface system and method of the present invention.
Figure 5:
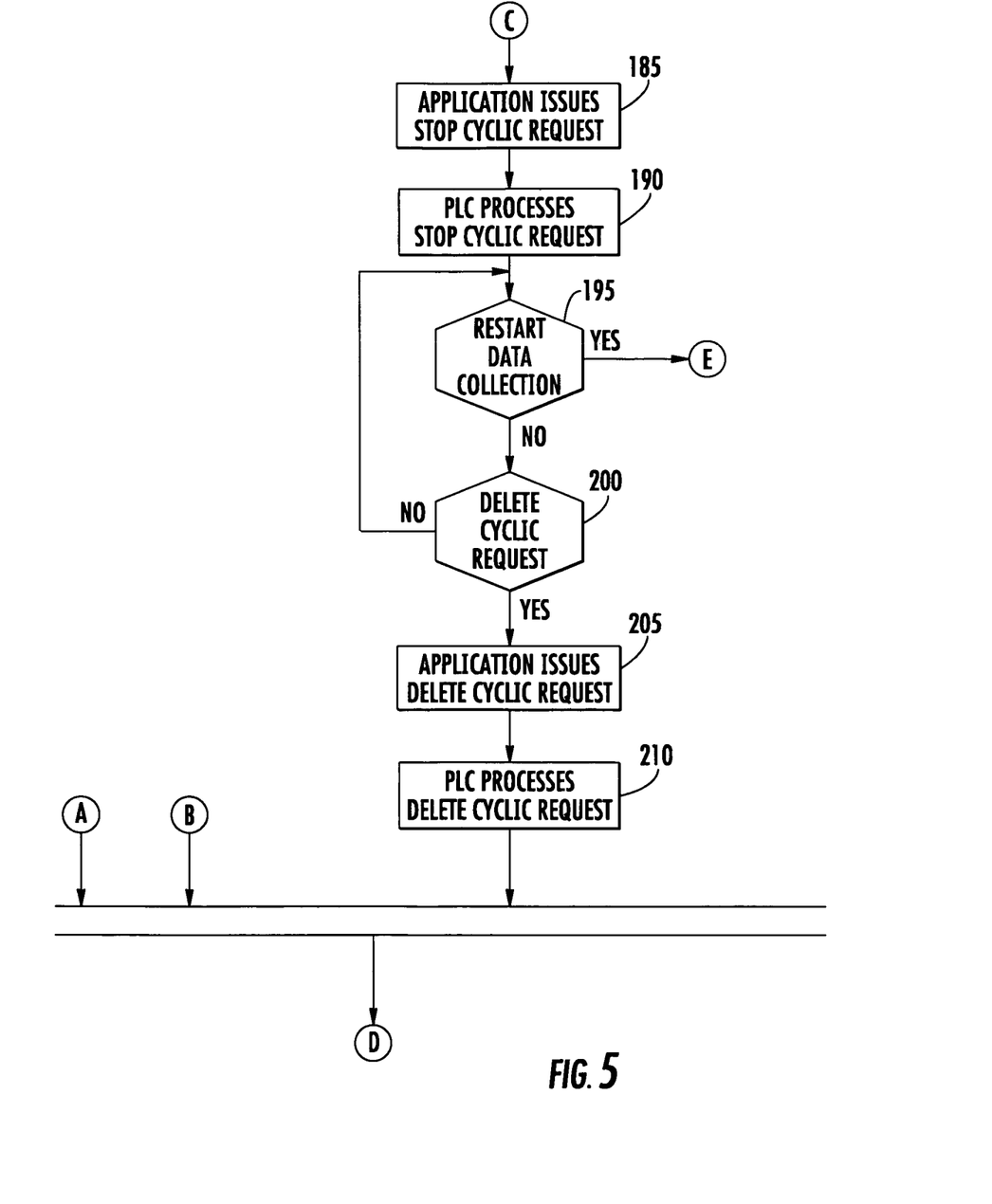
FIG. 5 is a continuation of the detailed flowchart of the asynchronous interface system and method as in FIG. 4.

Referring to FIGS. 4 and 5, it is important to note that multiple streams (100-120, 125-140, and 145-210) can occur simultaneously. This means that multiple reads, writes, and cyclics can all be occurring at the same time. For simplicity and clarity, only one stream of each is shown in FIGS. 4 and 5. These streams (100-120, 125-140, and 145-210) can also begin and stop at any time while the PLC is operational. These decisions are determined by the application.

With more specific reference to FIGS. 4 and 5, a data structure is created (100, 125, 145) by the external application. This data structure contains, for instance, the following information:

Data type of memory to be accessed. Types might be a bit, byte, word or the like as defined by the PLC.
Quantity of locations to be accessed.
Data block number to be accessed if the memory type is a data block.
Memory type to be accessed, such as flag, input, output, data block, and the like as supported by the PLC.
Starting memory address to be accessed.
Bit number to be accessed if the data type is a bit.
Pointer to a buffer to receive the data if the memory is to be read or a buffer that holds the data to write to memory.
Maximum size of the buffer to prevent memory overruns.
Status to return success or failure with error status of the access operation.

An array of these data structures can be passed to the interface to allow for multiple, noncontiguous memory accesses to be accomplished by a single call.

The Read stream (100-120) shown in FIGS. 4 and 5 is used when there is a desire to read a memory location from the PLC memory. The application, such as application 120 discussed above, will construct the data structure or an array of data structures to be used for the memory access call (100). The application will then issue an interface function call for an ODK_ReadData (105) with the following parameters:

A service handle, which specifies which PLC to access, in the case of multiple PLC's.
The data structure or array of data structures.
The number of data structures being passed.
A flag to specify whether the read is to take place immediately or at the earliest convenience of the PLC.

The PLC then processes request (110) and determines if the read is an immediate operation or an "as soon as possible" operation; i.e., by reading the flag noted above. If it is an immediate operation, the PLC gathers the data and returns it to the application (115). If it is an as soon as possible operation, the PLC may gather the data and return it immediately or wait until other critical operations are complete before gathering and returning the data (115). When the PLC gathers the data, it places the data in the buffer specified by the data structure being used. Once the application receives the data, it processes the data (120).

FIGS. 4 and 5 also show a Write stream (125-140). The Write stream (125-140) is used when the desire is to write to a memory location in the PLC memory. The application will construct a data structure or an array of data structures to be used for the memory access call (125). The application then issues an interface function call for an ODK_WriteData (130) with the following parameters:

A service handle, which specifies which PLC to access, in the case of multiple PLC's.
The data structure or array of data structures.
The number of data structures being passed.
A flag to specify whether the write is to take place immediately or at the earliest convenience of the PLC.

The PLC then processes the request (135) and determines if the write is an immediate operation or an "as soon as possible" operation. If it is an immediate operation, the PLC writes the data (140). If it is an as soon as possible operation, the PLC may write the data or may wait until other critical operations are complete before writing (140). The data to be written to the PLC is placed in the buffer of the data structure being used.

As further shown in FIGS. 4 and 5, data structure(s) for cyclic reads (145-210) are created similar to the read stream's data structures noted above. To initiate a cyclic operation, the application issues an interface function call for an ODK_CreateCyclicRead (150) with the following parameters:

A service handle, which specifies which PLC to access, in the case of multiple PLC's.
The data structure or array of data structures.
The number of data structures being passed.
A flag to specify whether the read is to take place immediately after its scheduling occurs or at the earliest convenience of the PLC.
A context pointer that will be used in the callback to identify the original calling entity.
A frequency that will determine how often the read will occur. This frequency should be in multiples of the minimum cycle time as defined by the PLC.
A flag to specify whether the scheduling should be started immediately or wait until a start command is issued.
A pointer to the callback function that will be called by the PLC when returning the data.
The actual frequency, which will be returned from the PLC telling the application how often the read will actually occur.
A job ID that is returned from the PLC identifying this request. This job ID will be used for future operations on this request.

When the PLC receives the create request, it adds the request to the queue with an associated job ID and determines if the request should be scheduled immediately or should wait for a start command (155). If it is to be scheduled immediately, it will begin the countdown until the read takes place. If it is not to be scheduled immediately, the request will not be started until a start request is received from the application. After processing the create request, the PLC returns the actual frequency of the data gathering and the job ID to the application; e.g., from the DLL 118 of the PLC 116 to the application 120 as described with respect to FIG. 3 above.

If the request is not started immediately in the create request, the application then issues an interface function call for an ODK_StartCyclicRead (160) with the following parameter:

The job ID of the request to start.

When the PLC receives this request, it will begin the countdown until the read takes place (165).

When the countdown completes in the PLC for a scheduled read request, the PLC gathers the data from the specified memory areas and places the information in the buffer provided by the application (as specified in the create request) (170). The PLC then makes a call to the callback method specified in the create request with the data in the buffer. The PLC then restarts the countdown until the next read. When the application receives this callback, it will process the data (175). This countdown, gathering of data, and reporting of data will continue until a stop request is received (180).

As shown in FIG. 5, if the application wishes to stop the gathering of data, it issues an interface function call for an ODK_StopCyclicRead (185) with the following parameter:

the job ID of the request to stop.

When the PLC receives this request, it stops the countdown until the next read and makes the read request "inactive" (190). This means that the read request ceases to be scheduled for execution, unless a start request is issued to restart it. At this point the request is effectively waiting to be restarted or deleted. If the application decides to restart the request (195), a start request is reissued (160) and the read process (160-180) described above is restarted. If the application decides it is finished collecting the data specified by the data structure (200), it issues an interface function call for an ODK_DeleteCyclicRead (205) with the following parameter:

The job ID of the request to delete.

When the PLC receives the delete request, it removes the request from the queue (210). At this point, if the data needs to be gathered again, a new create request will need to be reissued with a new data structure (145).

The callback method in the application that is called by the PLC has the following parameters:

The job ID of the request being processed.
The data structure or array of data structures.
The context pointer that was specified in the create cyclic request.

While various embodiments of the invention have been shown and described, the skilled artisan will recognize that many changes and modifications can be made to the foregoing embodiments without departing from the spirit and scope of the invention. For example, a PLC-equipped system according to the present invention can be programmed to perform an almost endless variety of functions. It will be further understood by those skilled in the art that multiple information exchanges between the PLC, controlled devices and applications can occur simultaneously, sequentially, and repetitively. Also, various program codes can be written using ladder logic, "C" language, object oriented program code such as C++, Java, or a number of other languages to suit a variety of these applications.

References, if used herein, referring to "master", "slave", "first," and "second" structures, elements, designations, geometries and the like are intended solely for purposes of providing an enabling disclosure and in no way suggest limitations regarding the operative orientation or order of operation of the exemplary embodiments or any components thereof. It is intended to claim all such changes and modifications as fall within the scope of the appended claims and their equivalents.

That which is claimed is:

1. A method for providing programmable logic controller data on demand, the method comprising:
   providing a programmable logic controller (PLC) having an internal memory and an external interface, wherein the external interface is implemented as a dynamic linked library (DLL) that provides direct memory access (DMA) transfers to and from the internal memory of the PLC;
   providing an external end user application executing on a processor external to the PLC, the application including an executable access code and a function call and operative to send the access code and the function call to the external interface of the PLC;

receiving the access code and function call at the external interface of the PLC;

responding to the access code by granting to the end user application by the PLC, access to the internal memory of the PLC, wherein, once the access code is received, the processor external to the PLC is operable to directly read from or write to, via asynchronous DMA transfers, the internal memory of the PLC with involvement of the PLC limited to executing the DLL.

2. The method of claim 1, wherein the function call is one of a read call, a write call, a cyclic data request, or combinations thereof.

3. The method of claim 2, further including:
receiving a call to create the cyclic data request; and
processing the cyclic data request.

4. The method of claim 2, further including:
receiving a call to terminate processing of the cyclic data request; and
terminating the processing.

5. The method of claim 2, further including receiving a call to delete a cyclic read of the memory.

6. The method of claim 1, further including returning data stored in the memory to the external application in response to the function call.

7. A system for providing programmable logic controller data on demand, the system comprising:

a programmable logic controller (PLC) having an internal memory and an external interface, wherein the external interface is implemented as a dynamic linked library (DLL) that provides direct memory access (DMA) transfers to and from the internal memory of the PLC; and an external end user application executing on a processor external to the PLC, the application including an executable access code and a function call, wherein the application is operative to send the access code and the function call to the external interface of the PLC, wherein the external interface of the PLC is operative to receive the access code and the function call from the end user application and to respond to the access code by granting to the end user application access to the internal memory of the PLC, wherein, once the access code is received, the processor external to the PLC is operable to directly read from or write to, via asynchronous DMA transfers, the internal memory of the PLC with involvement of the PLC limited to executing the DLL.

8. The system of claim 7 wherein the function call is one of a read call, a write call, a cyclic data request or combinations thereof.

9. The system of claim 8, wherein the external interface is operative to receive a call to create a cyclic data request and to process the cyclic data request.

10. The system of claim 8 wherein the external interface is operative to receive a call to terminate processing of a cyclic data request and to terminate the processing.

11. The system of claim 8 wherein the external interface is operative to receive a call to delete a cyclic read of the internal memory.

12. The system of claim 7 wherein the external interface is operative to return data stored in the internal memory to the external application in response to the function call.

13. A system for providing programmable logic controller data on demand, the system comprising:

a programmable logic controller (PLC) having an internal memory and an external interface, wherein the external interface is operative to enable direct memory access (DMA) transfers to and from the internal memory of the PLC;

an external application executing on a processor external to the PLC, the application including an executable access code and a function call, wherein the application includes instructions that when executed on the processor are operative to transmit the access code and the function call to the external interface of the PLC;

wherein the external interface includes executable instructions that when executed by the external interface are operative to:

receive the access code and the function call at the external interface of the PLC;

grant the external application access to the internal memory of the PLC in response to receiving the access code from the external application, wherein, once the access code is received, the processor external to the PLC is operable to directly read from or write to, via asynchronous DMA transfers, the internal memory of the PLC with involvement of the PLC limited to executing the external interface.

14. The system of claim 13 wherein the function call is one of a read call, a write call, a cyclic data request or combinations thereof.

15. The system of claim 14, wherein the external interface is operative to receive a call to create a cyclic data request and to process the cyclic data request.

16. The system of claim 14 wherein the external interface is operative to receive a call to terminate processing of a cyclic data request and to terminate the processing.

17. The system of claim 14 wherein the external interface is operative to receive a call to delete a cyclic read of the internal memory.

18. The system of claim 13 wherein the external interface is operative to return data stored in the internal memory to the external application in response to the function call.

* * * * *